(12) United States Patent
Van Valin

(10) Patent No.: US 9,149,925 B1
(45) Date of Patent: Oct. 6, 2015

(54) ERGONOMIC GARDEN TOOL HANDLE

(71) Applicant: Stephen Van Valin, Chester Springs, PA (US)

(72) Inventor: Stephen Van Valin, Chester Springs, PA (US)

(*) Notice: Subject to any disclaimer, the term of this patent is extended or adjusted under 35 U.S.C. 154(b) by 0 days.

(21) Appl. No.: 14/468,433

(22) Filed: Aug. 26, 2014

Related U.S. Application Data

(60) Provisional application No. 61/875,742, filed on Sep. 10, 2013.

(51) Int. Cl.
B25G 1/04 (2006.01)
B25G 1/10 (2006.01)
A01D 9/00 (2006.01)
A01B 1/02 (2006.01)

(52) U.S. Cl.
CPC .............. B25G 1/102 (2013.01); A01B 1/026 (2013.01); A01D 9/00 (2013.01)

(58) Field of Classification Search
USPC ............. 294/25, 58, 26, 57, 59, 54.5; 16/430, 16/422, 425; D8/107, 10; 172/371, 372, 172/378; 15/160, 143.1
See application file for complete search history.

(56) References Cited

U.S. PATENT DOCUMENTS

| 712,843 | A | * | 11/1902 | Paul | 294/58 |
|---|---|---|---|---|---|
| 845,592 | A | | 2/1907 | Stewart | |
| 1,061,217 | A | * | 5/1913 | Breeden | 294/52 |
| 2,710,571 | A | | 6/1955 | Pfister | |
| 3,751,094 | A | * | 8/1973 | Bohler | 294/58 |
| 4,701,142 | A | * | 10/1987 | Merritt | 294/58 |
| 4,704,758 | A | | 11/1987 | Hoffman | |
| 4,924,924 | A | * | 5/1990 | Stewart | 16/426 |
| 4,962,561 | A | * | 10/1990 | Hamilton | 15/143.1 |
| 5,060,343 | A | | 10/1991 | Nisenbaum | |
| 5,156,429 | A | | 10/1992 | Adams | |
| 5,275,068 | A | * | 1/1994 | Wrench | 30/296.1 |
| 5,771,535 | A | | 6/1998 | Blessing | |
| 5,774,937 | A | * | 7/1998 | Caminos | 16/425 |
| 5,802,960 | A | * | 9/1998 | Graj et al. | 99/403 |
| 6,082,795 | A | | 7/2000 | Fornelli | |
| 6,435,284 | B1 | * | 8/2002 | Aman | 172/371 |
| 6,598,266 | B1 | * | 7/2003 | Elliott | 16/430 |
| 6,684,459 | B2 | | 2/2004 | Dickhaus | |
| 6,698,064 | B1 | | 3/2004 | Graj et al. | |
| 7,284,301 | B2 | | 10/2007 | Czuwala | |
| 7,637,882 | B2 | | 12/2009 | Carman, Jr. et al. | |
| 2002/0109364 | A1 | * | 8/2002 | Graves | 294/58 |
| 2005/0034277 | A1 | | 2/2005 | Wing | |
| 2007/0114806 | A1 | * | 5/2007 | Ferguson | 294/25 |
| 2010/0320785 | A1 | * | 12/2010 | Trott | 294/58 |
| 2011/0042982 | A1 | | 2/2011 | Coutu | |

FOREIGN PATENT DOCUMENTS

| GB | 2248034 | * 3/1992 | ............... B25G 1/10 |
|---|---|---|---|
| GB | 2459912 | 11/2009 | |

* cited by examiner

Primary Examiner — Paul T Chin
(74) Attorney, Agent, or Firm — Wendy W. Koba

(57) ABSTRACT

An ergonomic tool handle is designed for "one-handed" use by incorporating a hand grip and a forearm support in a compact arrangement. The tool handle includes a longitudinal shaft with a vertical hand grip formed at one end and a forearm support at the opposing end. The hand grip is essentially U-shaped and oriented such that the "U" is upside-down and attached to the longitudinal shaft at two separate locations (the "top" ends of each leg of the "U"). The forearm support takes the form of an enlarged support area (with respect to the diameter of the shaft) and in one embodiment is V-shaped (with a cross-member attached between the legs of the "V"). Preferably, various tool implements may be removably attached to the longitudinal shaft of the handle (e.g., screw-on, locking pin, etc.).

15 Claims, 8 Drawing Sheets

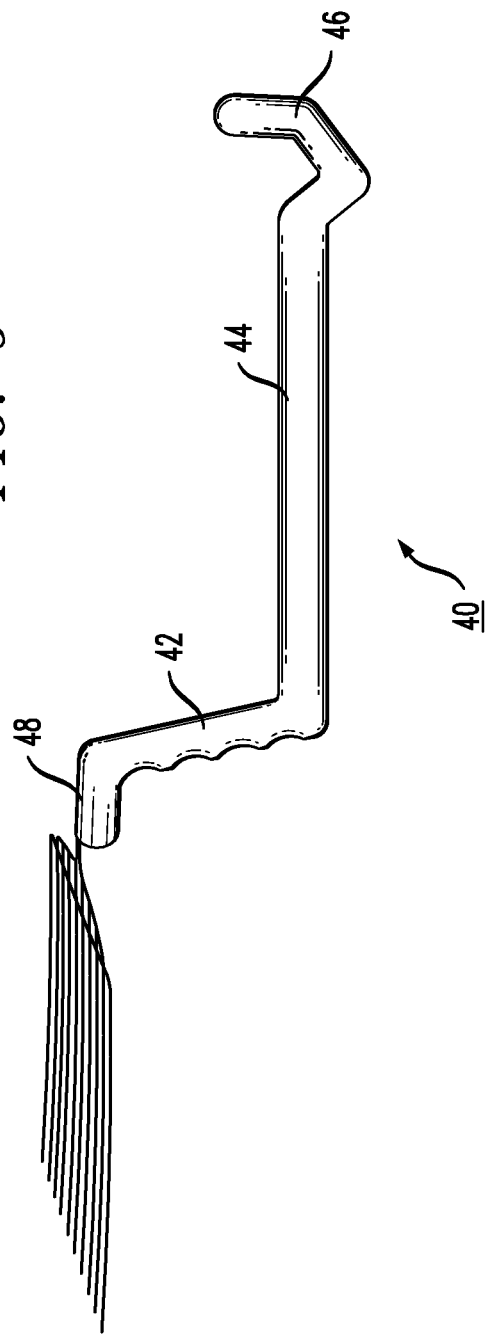

ERGONOMIC GARDEN TOOL HANDLE

CROSS-REFERENCE TO RELATED APPLICATION

This application claims the benefit of U.S. Provisional Application Ser. No. 61/875,742, filed Sep. 10, 2013 and incorporated herein by reference.

TECHNICAL FIELD

The present invention relates to a garden tool handle and, more particularly, to an ergonomic handle that is designed for "one-handed" use by incorporating a hand grip and a forearm support in a compact arrangement.

BACKGROUND OF THE INVENTION

There are many lawn and garden chores that need to be handled on a continual basis, usually involving the homeowner doing the work his or herself. At times, awkward lifting, raising, and positioning of soil, peat moss, mulch, compost, leaves or the like causes strains and back problems. Additionally, the standard tools available for performing various ones of these tasks are not always well-suited for the job at hand. For example, when trying to carefully apply mulch around already-planted specimens, it is generally difficult to control the placement of the material, resulting in covering the plant with mulch, having mulch land in the wrong location, etc.

A hand-held gardening tool is thus preferred when attempting to perform precise and accurate weeding, cultivating, planting and digging in a small enclosed or isolated area. A gardener using a hand-held tool can work on a small enclosed plot for plants and bulbs or an area within a garden surrounded by plants with a minimum of disruption or damage to the surrounding plants. A hand-held tool is typically ideal when a larger gardening implement might otherwise be impractical to use. Similarly, the hand-held tool is generally preferred over larger gardening tools because the hand-held tool requires the use of only one hand, takes up minimum space and is easily stored. The drawbacks, however, to working with a conventional hand-held gardening tool are that the user needs to bend over, kneel or sit down in order to get close enough to the ground to effectively garden. Additionally, when attempting to perform landscaping that involves the movement of mulch, peat moss or the like, the small hand-held tools are not properly sized for the job.

In an effort to solve the problem of fatigue associated with applying sufficient hand and arm pressure to the gardening tool to penetrate the soil, gardening tools with elongated shafts of varying lengths to provide additional leverage have been introduced. However, many of these tools require unnatural hand/wrist alignment during use. Additionally, as the length of the elongated shaft increases, a user needs to use both hands in order to gain enough leverage to garden effectively. Thus, while the elongated shaft decreases the amount of back and leg fatigue, the fatigue of the hands, wrists and arms increase by requiring the use of both hands.

SUMMARY OF THE INVENTION

The needs remaining in the prior art are addressed by the present invention, which relates to a garden tool handle that is designed for "one-handed" use by incorporating a hand grip and a forearm support in a compact arrangement.

In one embodiment, the tool handle of the present invention comprises a longitudinal shaft with a vertical hand grip formed at one end and a forearm support at the opposing end. The hand grip is essentially U-shaped and oriented such that the "U" is upside-down and attached to the longitudinal shaft at two separate locations (the "top" ends of each leg of the "U"). The forearm support takes the form of an enlarged support area (with respect to the diameter of the shaft) and in one embodiment is V-shaped (with a cross-member attached between the legs of the "V").

The tool handle of the present invention preferably includes an attachment mechanism at the end of the shaft near the hand grip. The attachment mechanism allows for different tool implements to be interchangeably coupled to the tool handle. For example, a terminal portion of the shaft may be threaded, and each separate tool implement may include a screw-on cap.

The tool handle may be formed of a single, molded component, or may comprise multiple piece parts that are (permanently) joined together. Alternatively, the longitudinal shaft and the forearm support may be formed as a single component (perhaps molded), with the hand grip formed as a separate component that is later attached to the shaft.

Additional structural support may be provided to the tool structure by forming an associated tool implement to include a horizontal extension bar, with the threaded end portion of the tool handle formed to include an aperture that accepts the extension bar when the tool implement is attached to the handle.

In another embodiment, the inventive tool handle may be tubular in form (and made of metal, for example), comprising a pipe-like shaft. The hand grip is formed by creating at least one bend in the shaft, with the forearm support formed by bending the opposing end of the shaft into a rounded configuration that surrounds a portion of a forearm in proximity to the elbow.

While various embodiments of the inventive tool handle will be described in the context of its use as a handle for a "garden" tool, it is to be understood that the ergonomic handle may indeed be used, or incorporated with, a variety of tools used for different purposes including, but not limited to, masonry, brick work, tiling, or the like.

Other and further features and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 9 illustrates yet another embodiment of the present invention, in this case with a raised tool attachment location (raised with respect to the longitudinal shaft of the tool handle).

DETAILED DESCRIPTION

Figure 1:
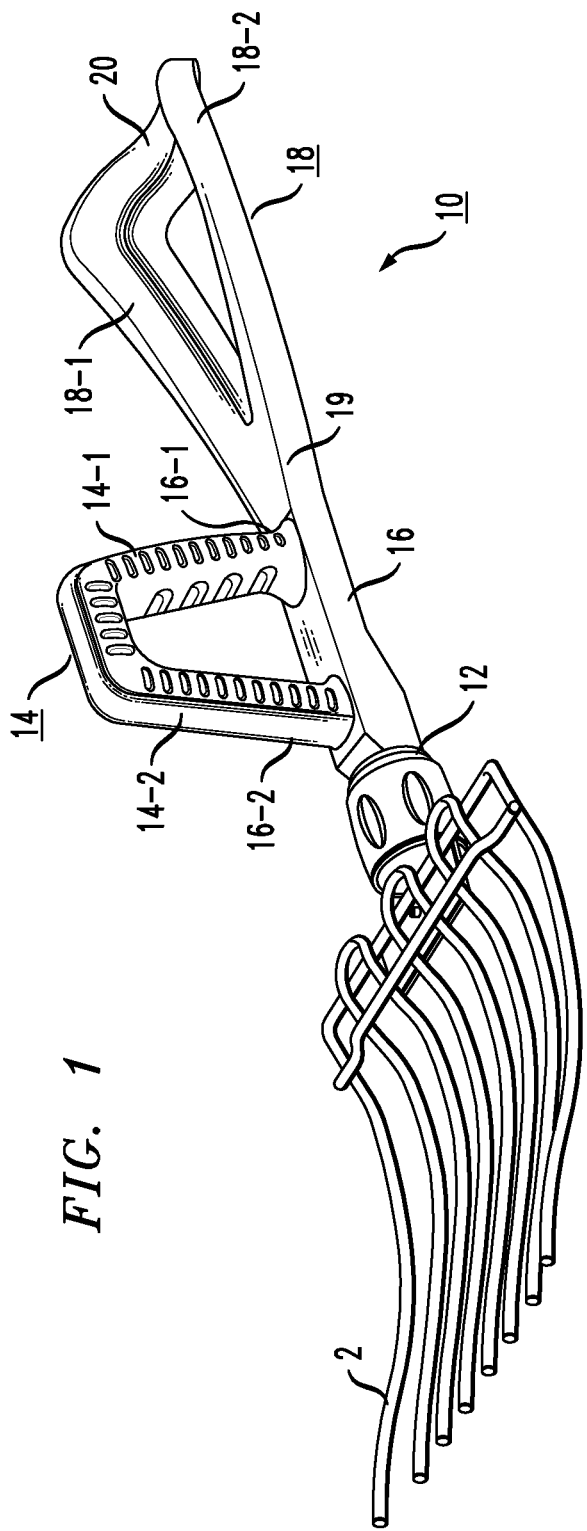
FIG. 1 is an isometric view of an exemplary tool handle formed in accordance with the present invention to allow for various gardening tasks to be performed in a "one-armed" fashion, in this view with the tool handle removably attached to a selected tool implement.

FIG. 1 is an isometric view of an exemplary garden tool including an ergonomic tool handle 10 formed in accordance with the present invention. In the particular embodiment shown in FIG. 1, a pitch fork attachment 2 is shown as removably attached to a first end termination 12 of handle 10. A hand grip 14 is formed on an upper surface of a longitudinal shaft 16 of handle 10. Hand grip 14 is shown as comprising an upside-down U-shaped grip component that includes two spaced-apart legs, denoted 14-1 and 14-2 in FIG. 1, with legs 14-1 and 14-2 attached to shaft 16 at locations 16-1 and 16-2, respectively. This two-point attachment of hand grip 14 to shaft 16 is considered to provide rugged attachment that minimizes the possibility of hand grip 14 coming apart from shaft 16. Moreover, while designed predominantly to be a "one-handed" tool handle, the utilization of a hand grip that includes two separate "legs" allows for tool to also be used as a "two-handed" too, when necessary. Hand grip 14 is preferably formed to include finger indentations on leg 14-1, enabling the user to maintain a secure grip on handle 10.

In accordance with the present invention, handle 10 also includes a component for supporting the user's forearm, allowing for easy one-handed use of the tool. In the embodiment shown in FIG. 1, a V-shaped forearm support 18 is shown as extending outward from a second, opposing end termination 19 of shaft 16. Forearm support 18 terminates in a cross-member 20 that extends between sections 18-1 and 18-2 of forearm support 18.

In use, an individual is able to use hand grip 14 to easily move garden tool attachment (in this case, pitch fork tines 2) in any desired direction, with his/her forearm comfortably resting on support 18 and providing additional strength to lifting and moving gardening material in place on the tool. While the configuration of the present invention is intended to enable "one-arm" performance of various gardening tasks, as mentioned above, it is possible to also utilize handle 10 in two-handed fashion, since hand grip 14 includes a pair of legs 14-1 and 14-2 that can both be used as grips.

Figure 2:
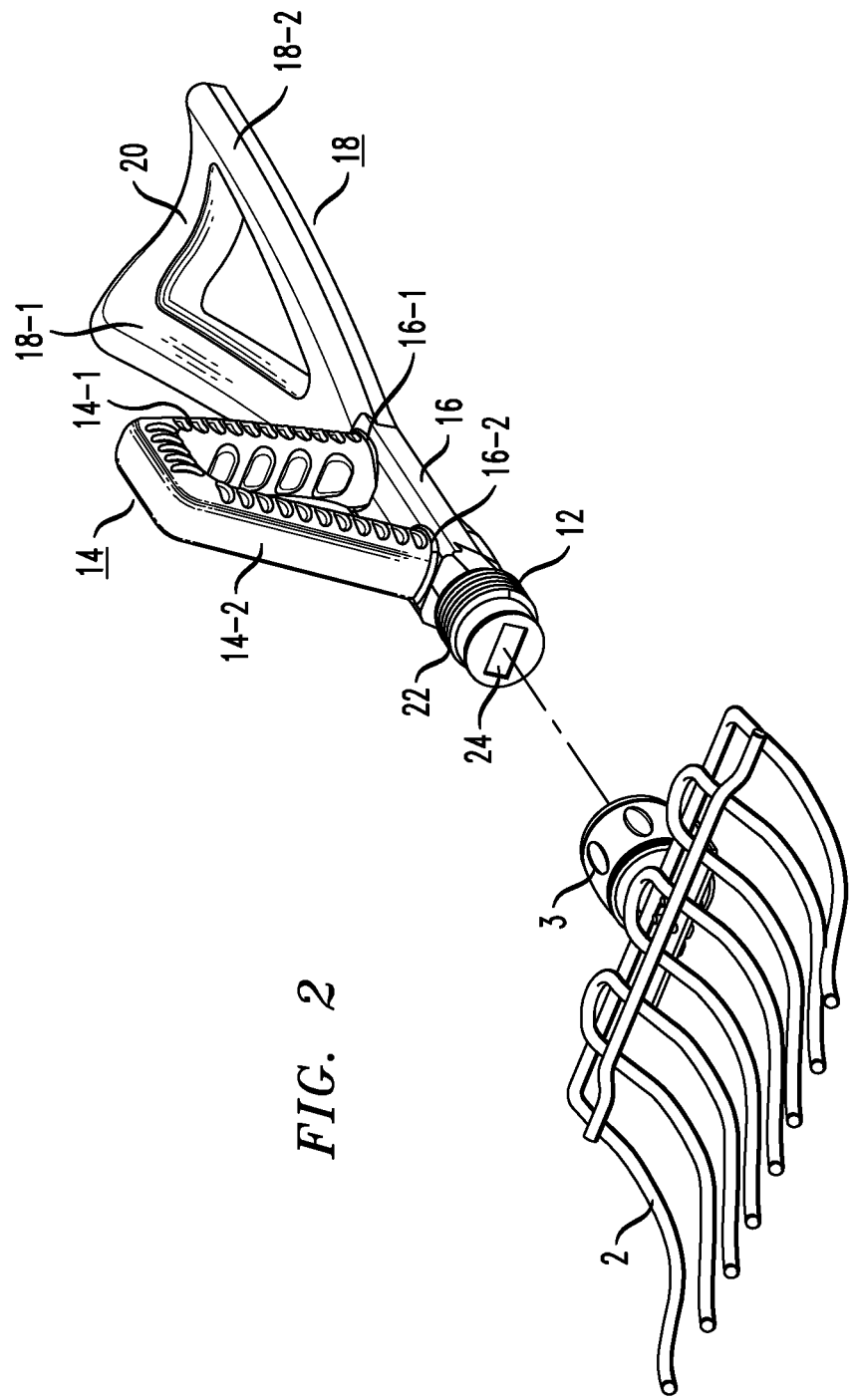
FIG. 2 is an exploded view of the configuration of FIG. 1, illustrating the tool implement as separated from the tool handle.

In a preferred embodiment of the present invention, the specific garden tool (such as pitch fork tines 2 as shown in FIG. 1) is removably attached to first end termination 12 of tool handle 10. FIG. 2 is an exploded view of the configuration of FIG. 1, illustrating tines 2 as separate from tool handle 10. In this particular embodiment, a threaded arrangement is used to removably attach a garden tool implement to tool handle 10. Referring to FIG. 2, first end termination 12 is shown as including a threaded throat portion 22 that is used to removably attach the various tool implements to the handle. In order to complete this attachment, tool 2 is formed to include a cap 3 that includes a threaded interior surface (not visible in this view).

Figure 3:
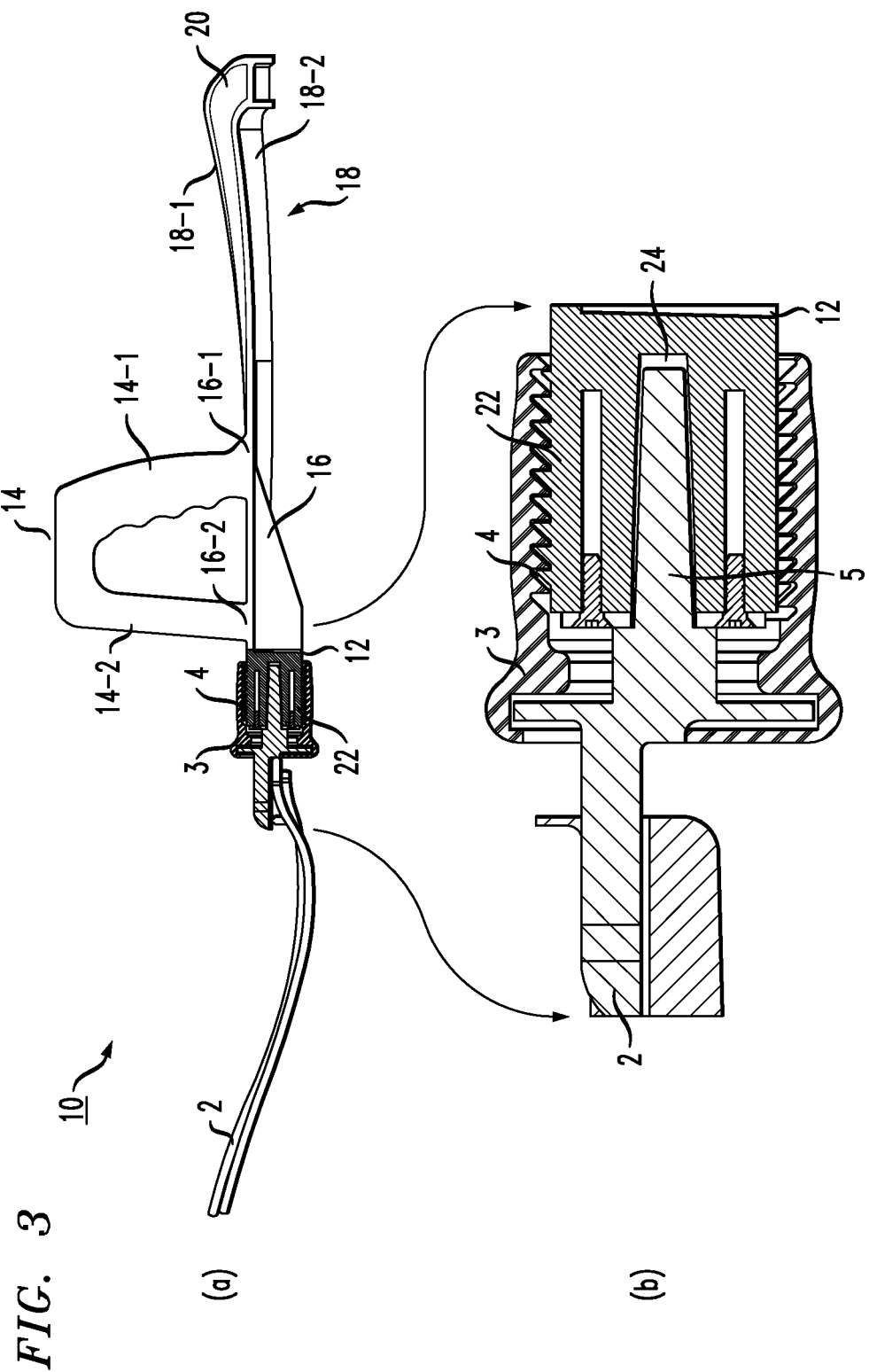
FIG. 3 is a cut-away side view of the embodiment of FIGS. 1 and 2, illustrating an exemplary manner for removably attaching a tool implement to the inventive handle.

FIG. 3 is a cut-away side view of this embodiment, with FIG. 3(a) being a side view of the complete tool handle 10, and FIG. 3(b) illustrating an enlargement of the region of tool handle 10 that removably attaches to a specific tool implement. The enlargement of FIG. 3(b) shows, in particular, a threaded interior surface 4 of cap 3, as it is engaged with threaded throat portion 22 of first end termination 12 of handle 10.

Also evident in FIG. 3 is an additional structural support configuration that may be used in a preferred embodiment to stabilize the attachment of the tool implement to the handle. In this case, the structural support configuration takes the form of an extension 5 formed as part of tool 2. When attaching tool 2 to handle 10, extension 5 is positioned to be inserted into an aperture 24 formed through the center of first end termination 12 of handle 10. Indeed, aperture 24 best shown in the exploded view of FIG. 2. The use of extension 5 is considered as a preferred arrangement for tools associated with heavy-duty use. In this arrangement, cap 3 is formed as a locking cap, that rotates and screws onto threaded throat portion 22 once extension 5 is fully engaged within aperture 24.

Figure 4:
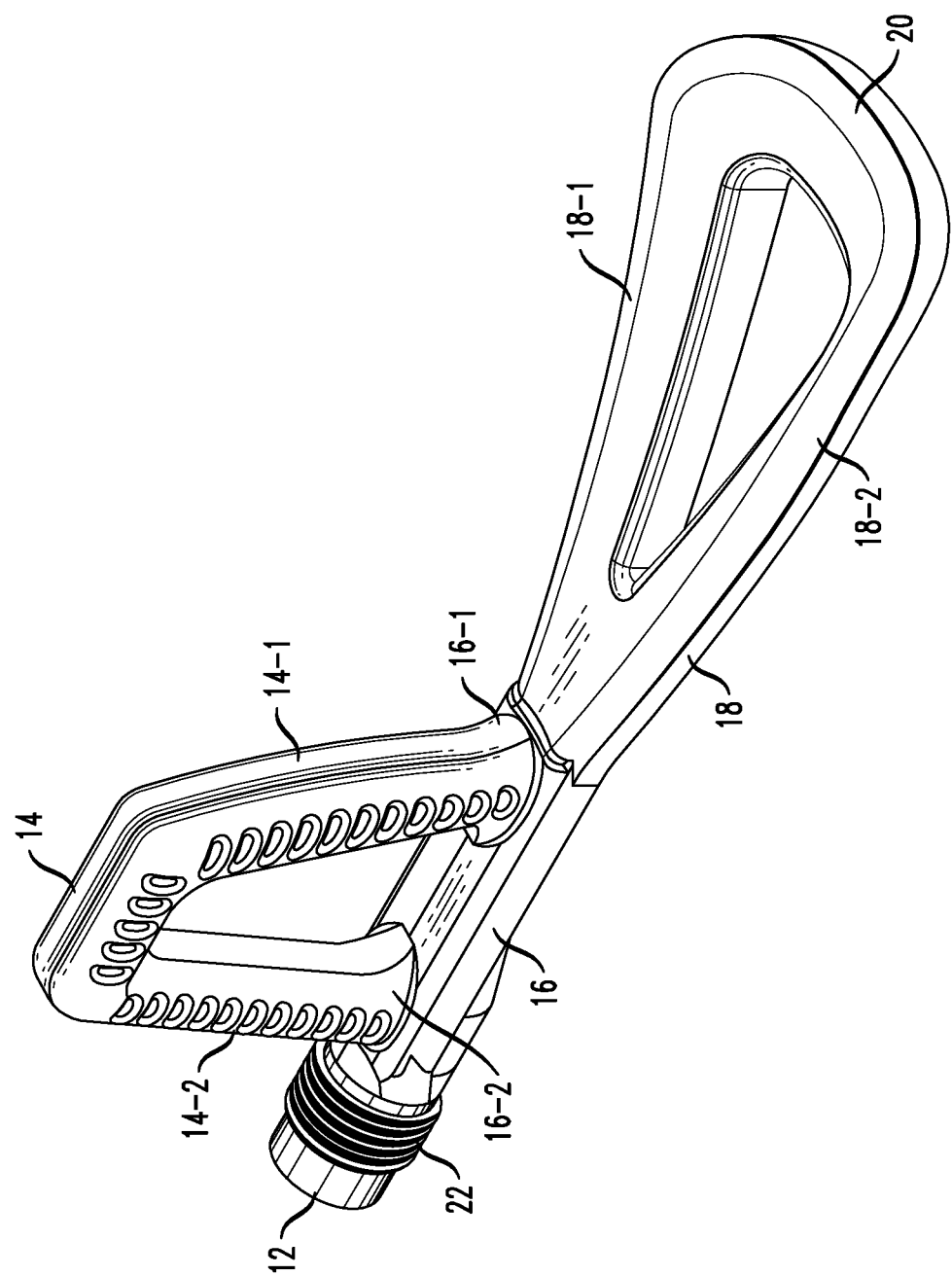
FIG. 4 is another isometric view of a tool handle formed in accordance with the present invention.

FIG. 4 is an isometric view of tool handle 10, clearly illustrating every component of this particular embodiment. In particular, threaded throat portion 22 of first end termination 20 is clearly shown in this view, as well as the attachment of hand grip 14 to longitudinal shaft 16. In some embodiments, shaft 16 and forearm support 18 may be formed as a single piece of material (such as a molded plastic component), with hand grip 14 attached to shaft 16. Hand grip 14 may be bonded to shaft 16 using any appropriate method that is considered to ensure permanent attachment. Indeed, it is also possible to form all three components—hand grip 14, shaft 16 and forearm 18—as a unitary structure (formed of a molded, heavy-duty plastic, for example).

As mentioned above, in a preferred embodiment of the present invention, tool handle 10 is removably attached to a specific tool, thus allowing for different types of tools to be used with the same handle. The use of threaded components is considered to be one way to accomplish this type of removable attachment. Other arrangements may be used, such as apertures and spring-loaded locking pins, through-wall screw attachments, etc. Any suitable type of removable attachment is suitable for use in accordance with the ergonomic tool handle of the present invention. Moreover, while these embodiments illustrate the utilization of the inventive tool handle with implements generally associated with gardening, it is contemplated that the handle itself may be used with (or integrally formed as part of) any sort of tool for handwork that lends itself to providing "one-handed" capabilities.

Figure 5:
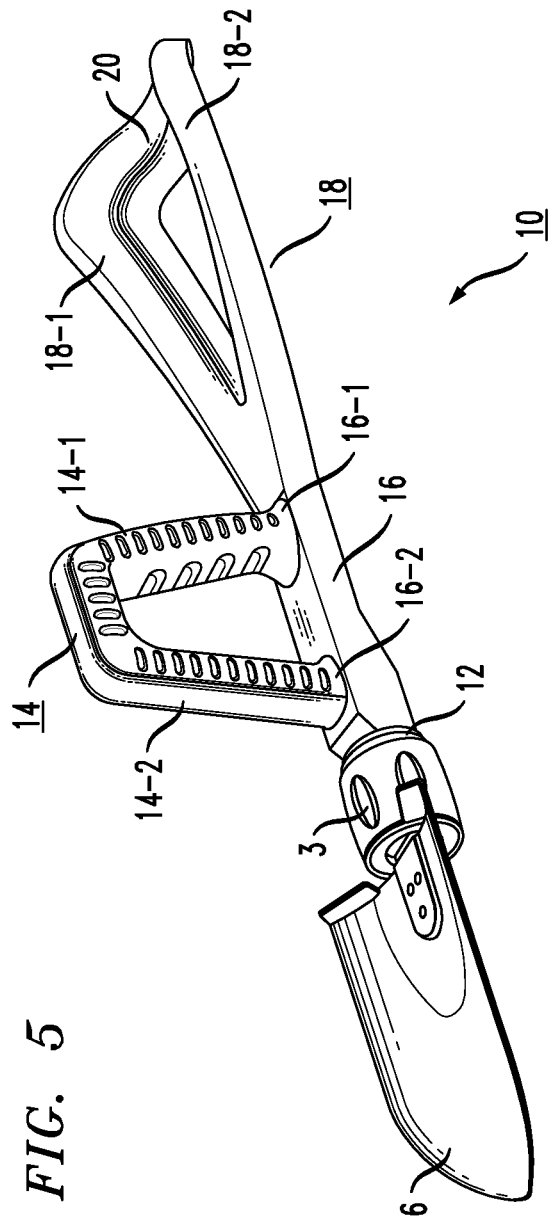
FIG. 5 illustrates the inventive tool handle as removably attached to a different tool implement.
Figure 6:
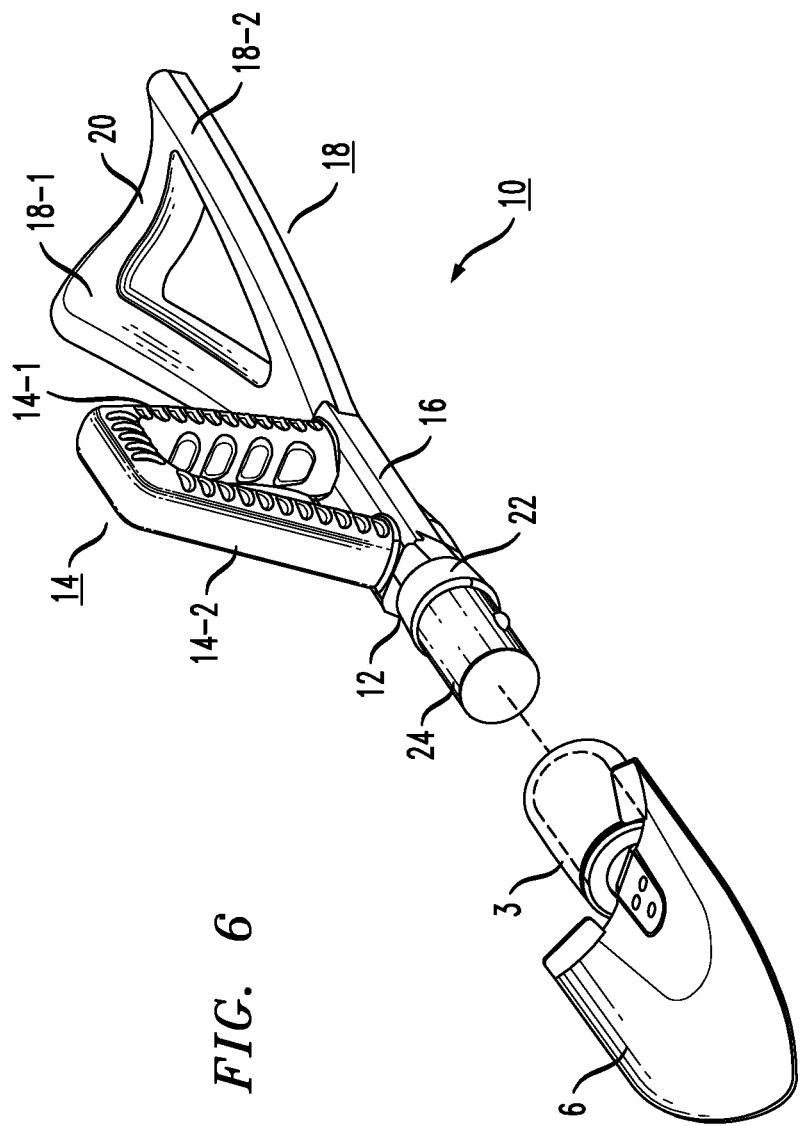
FIG. 6 is an exploded view of the embodiment of FIG. 5.

FIG. 5 illustrates an embodiment of tool handle 10 as removably attached to a different tool—in this case, a spade tool 6. FIG. 6 is an exploded view of the arrangement of FIG. 5, in this case illustrating the use of a spring-loaded locking pin, which may be used to attach spade tool 6 to tool handle 10.

In a preferred embodiment, the handle is a separate component that may be attached to a variety of different types of garden tools—pitchfork, spade, rake, shovel, or the like. However, it is also possible to provide a tool where the handle is an integral member of the tool with the specific implement. Indeed, the handle and tool may be formed of single-piece construction (e.g., molded plastic), where this may be appropriate for some uses, such as for a smaller-sized children's tool (sand shovel, snow shovel, or the like).

Figure 7:
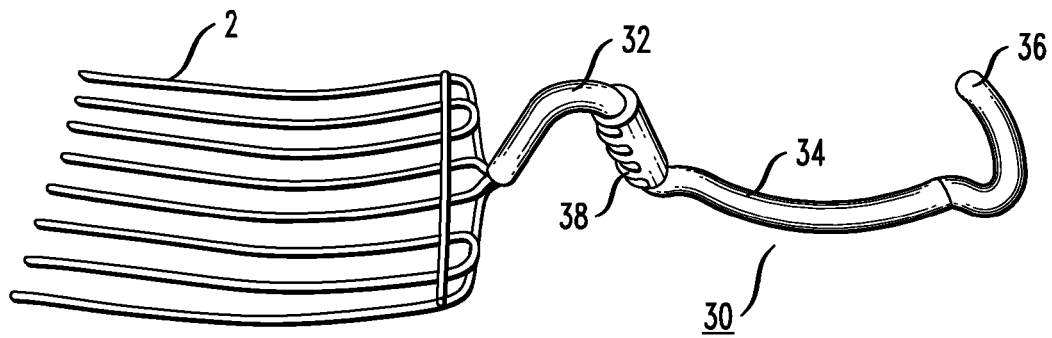
FIG. 7 illustrates an alternative embodiment of the present invention, in this case forming a hand grip from a portion of the tool shaft.
Figure 8:
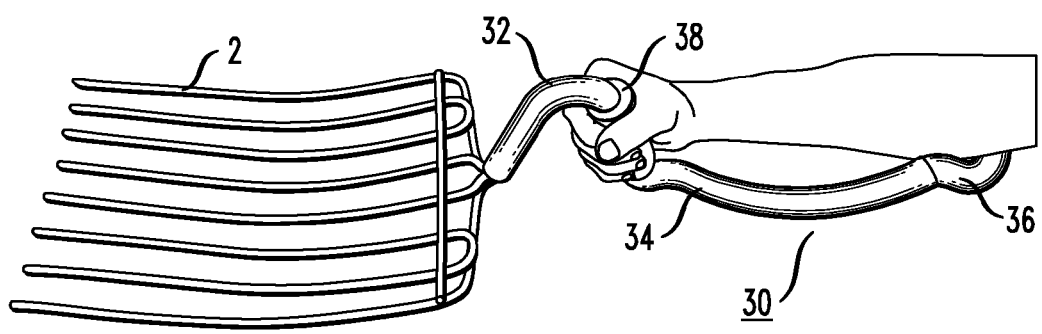
FIG. 8 is another view of the embodiment of FIG. 7, in this case illustrating the position of a forearm along the tool.

FIG. 7 illustrates an alternative embodiment of an ergonomic garden tool handle, shown as tool handle 30, formed in accordance with the present invention. In this case, pitch fork tines 2 is shown as an integral part of the tool. In this particular embodiment, a hand grip 32 is formed as an inverted-V portion of a longitudinal shaft 34 of tool 30. In accordance with the present invention, tool handle 30 terminates in a forearm support member 36. In the embodiment shown in FIG. 7, forearm support member 36 comprises an upwardly-curved end termination of shaft 34, allowing for an individual to rest his/her forearm within support member 36. FIG. 8 illustrates the use of this forearm support feature of tool handle 30, showing a gardener's forearm in position and resting upon forearm support member 36.

Referring back to FIG. 7, hand grip 32 is shown as including a finger grip element 38, positioned to allow for the user to hold hand grip 32 in a comfortable manner, while also ensuring the steady operation of tool handle 30. Again, the illustration of FIG. 8 shows the user's hand in position around grip 38.

FIG. 9 illustrates an alternative embodiment of the present invention. Like the embodiments described above, this particular arrangement of an ergonomic tool handle 40 includes a hand grip 42, a longitudinal shaft 44 and a forearm support member 46. As with the embodiment described above in association with FIGS. 7 and 8, forearm support member 46 is formed as a slightly cupped end termination of longitudinal shaft 44. Thus, when in use, an individual's forearm will comfortably rest on support member 46.

In contrast to the prior configurations, however, hand grip 42 does not exhibit a U-shaped or V-shaped form. Here, hand grip 42 takes the form of a vertical shaft ("vertical" with respect to a horizontal positioning of longitudinal shaft 44) and then terminates in a short terminal portion 48, in this particular embodiment, there is no V-shaped member, and the tool head is directly connected to an end termination 38 of hand grip 32. This elongated end termination 38 is intended to help secure hand grip 32, and assist in the lifting and movement of heavy loads.

Having described preferred embodiments of the invention with reference to the accompanying drawings, it will be appreciated that the present invention is not limited to those precise embodiments, and that various changes and modifications can be effected therein by one of ordinary skill in the art without departing from the spirit or the scope of the invention as defined by the claims appended hereto. Indeed, while the various embodiments illustrate the use of the handle with garden tool implements, various other tools for other applications may also utilize the handle of the present invention.

What is claimed is:

1. An ergonomic tool handle comprising
   a longitudinal shaft having a first end termination and a second, opposing end termination;
   a U-shaped hand grip coupled to the longitudinal shaft, the U-shaped hand grip defined as including a first leg and a second leg and disposed such that the first leg is attached proximate to the first end termination of the longitudinal shaft and the second leg is attached proximate to the second end termination of to the longitudinal shaft, the second leg including a gripping surface for one-handed use of the ergonomic tool handle; and
   a forearm support member attached to the second end termination of the longitudinal shaft, extending rearwardly along the longitudinal axis and expanding in width from the second end termination to the forearm support member termination.

2. The ergonomic tool handle as defined in claim 1 wherein the forearm support member comprises a V-shaped member defined at a pair of outwardly extending legs that are joined together at an apex, the apex of the V-shaped member coupled to the second end termination of the longitudinal shaft, the forearm support member further comprising a cross-member disposed between the distal ends of the extending legs.

3. The ergonomic tool handle as defined in claim 1 wherein the first end termination of the longitudinal shaft includes a mechanism for releasably attaching a tool implement thereto.

4. The ergonomic tool handle as defined in claim 3 wherein the mechanism comprises an outer threaded throat portion of the first end termination, for mating within an internally-threaded cap of an associated tool implement.

5. The ergonomic tool handle as defined in claim 3 wherein the mechanism comprises at least one spring-loaded pin for mating with an aperture formed in a coupling portion of a tool implement.

6. The ergonomic tool handle as defined in claim 3 wherein the first end termination further comprises a central aperture for accepting an extension support member of a tool implement, the extension support member providing structural support to a combination of the tool implement and the tool handle.

7. The ergonomic tool handle as defined in claim 1 wherein the longitudinal shaft and the forearm support member comprise a single, unitary structure.

8. The ergonomic tool handle as defined in claim 7 wherein the combination of the longitudinal shaft and the forearm support member are formed as a molded plastic piece part.

9. The ergonomic tool handle as defined in claim 1 wherein the longitudinal shaft and the U-shaped hand grip comprise a single, unitary structure.

10. The ergonomic tool handle as defined in claim 9 wherein the combination of the longitudinal shaft and the U-shaped hand grip are formed as a molded plastic piece part.

11. The ergonomic tool handle as defined in claim 1 wherein the longitudinal shaft, the U-shaped hand grip and the forearm support member comprise a single, unitary structure.

12. The ergonomic tool handle as defined in claim 11 wherein the combination of the longitudinal shaft, the U-shaped hand grip and the forearm support member are formed as a molded plastic piece part.

13. An ergonomic garden tool comprising
    a garden tool head; and
    a tool handle coupled to the garden tool head, the tool handle comprising
       a longitudinal shaft having a first end termination and a second, opposing end termination;
       a U-shaped hand grip coupled to the ongitudinal shaft, the U-shaped hand grip defined as including a first leg and a second leg and disposed such that the first leg is attached proximate to the first end termination of the longitudinal shaft and the second leg is attached proximate to the second end termination of the longitudinal shaft, the second leg including a gripping surface for one-handed use of the ergonomic tool handle; and
    a forearm support member attached to the second end termination of the longitudinal shaft, extending rearwardly along the longitudinal axis and expanding in width from the second end termination to the forearm support member termination.

14. The ergonomic garden tool as defined in claim 13 wherein the garden tool head is permanently attached to the tool handle.

15. The ergonomic garden tool as defined in claim 13 wherein the garden tool head is removably attached to the tool handle.

\* \* \* \* \*